United States Patent
Song et al.

(10) Patent No.: US 10,409,297 B2
(45) Date of Patent: Sep. 10, 2019

(54) DYNAMIC GAS BLENDING SYSTEM AND PROCESS FOR PRODUCING MIXTURES WITH MINIMAL VARIATION WITHIN TOLERANCE LIMITS AND INCREASED GAS UTILIZATION

(71) Applicants: Xuemei Song, East Amherst, NY (US); Carl Richenberg, Batavia, NY (US); Lloyd A. Brown, Amherst, NY (US)

(72) Inventors: Xuemei Song, East Amherst, NY (US); Carl Richenberg, Batavia, NY (US); Lloyd A. Brown, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 392 days.

(21) Appl. No.: 14/613,088

(22) Filed: Feb. 3, 2015

(65) Prior Publication Data
US 2015/0217245 A1    Aug. 6, 2015

Related U.S. Application Data

(60) Provisional application No. 61/936,512, filed on Feb. 6, 2014.

(51) Int. Cl.
*B01F 15/04* (2006.01)
*G05D 11/13* (2006.01)

(52) U.S. Cl.
CPC ........ *G05D 11/138* (2013.01); *B01F 15/0479* (2013.01); *G05D 11/132* (2013.01)

(58) Field of Classification Search
CPC ... B01F 15/0479; G05D 11/08; G05D 11/132; G05D 11/138

USPC ....................................................... 366/152.1
See application file for complete search history.

(56) References Cited

U.S. PATENT DOCUMENTS

| | | | |
|---|---|---|---|
| 3,721,253 A | 3/1973 | Remke | |
| 3,856,033 A | 12/1974 | Strain et al. | |
| 5,537,914 A * | 7/1996 | Gibney | B67D 1/0016 137/101.19 |
| 6,772,781 B2 | 8/2004 | Doty et al. | |
| 7,325,560 B2 | 2/2008 | Arno et al. | |
| 9,239,278 B2 | 1/2016 | Henry | |
| 2001/0032668 A1* | 10/2001 | Doty | G05D 11/132 137/93 |
| 2004/0002170 A1 | 1/2004 | Shimizu et al. | |
| 2007/0047383 A1* | 3/2007 | Williams | B01F 5/0453 366/162.1 |
| 2007/0169837 A1* | 7/2007 | Cohen | B01F 3/028 141/102 |

(Continued)

FOREIGN PATENT DOCUMENTS

| EP | 0 729 085 A1 | 8/1996 | |
|---|---|---|---|
| WO | WO 03/083451 A2 | 10/2003 | |
| WO | WO 2007026316 A2 * | 3/2007 | G05D 11/132 |

*Primary Examiner* — Marc C Howell
(74) *Attorney, Agent, or Firm* — Nilay S. Dalal

(57) ABSTRACT

A dynamic blending system and process to produce a mixture of a desired target concentration with minimal tolerance variation and no waste gas generation is provided. The mixture made from the blending process can be utilized without the need to vent. The inventive system and process enables the ability to perform relatively small adjustments to the concentration of the blended gas mixture. The system and process also includes specifically designed sampling protocols that reduce measurement error.

15 Claims, 2 Drawing Sheets

(56) References Cited

U.S. PATENT DOCUMENTS

2010/0030390 A1* 2/2010 Yamaguchi .......... G05D 7/0664
                                                    700/285
2010/0224264 A1   9/2010 Homan et al.
2012/0000559 A1   1/2012 Akhea
2012/0227816 A1   9/2012 Song et al.

* cited by examiner

DYNAMIC GAS BLENDING SYSTEM AND PROCESS FOR PRODUCING MIXTURES WITH MINIMAL VARIATION WITHIN TOLERANCE LIMITS AND INCREASED GAS UTILIZATION

RELATED APPLICATIONS

This application claims the benefit of priority to U.S. provisional application Ser. No. 61/936,512 filed on Feb. 6, 2014, the disclosure of which is incorporated by reference herein in its entirety.

FIELD OF THE INVENTION

This invention relates to a system and process for dynamically blending gases with minimal tolerance variation, in combination with no waste gas generation and increased gas utilization.

BACKGROUND OF THE INVENTION

The blending of two or more gases to form a predetermined homogeneous gaseous mixture is fundamental to many industrial processes. As an example, the solar and LCD industries currently rely on the use of dilute dopant gas mixtures for doping semiconductor materials, and the like.

In addition to requiring high purity, product gas mixtures used in the semiconductor industry also require a target composition controlled within a very tight tolerance limit to be suitable for advanced semiconductor manufacturing. Compared to other gas processing industries, acceptable compositional tolerance limits within the semiconductor industry are narrow and are getting narrower. The allowable variation in each gas component in the product gas can be as low as plus or minus 0.1% of the target concentration with the specific tolerance limits being dependent on the active gas component that is being blended.

Generally, dopant gas mixtures used in advanced semiconductor manufacturing are filled into, stored in and delivered using gas cylinders. There are three typical methods used in practice to fill cylinders with gas mixtures, namely pressure-based methods, gravimetric-based methods, and dynamic blending methods. The pressure-based method uses pressure changes in the cylinder as each component is added to determine when the correct amount of each component has been added to the cylinder. The setup for the pressure-based method is very simple and easy to implement. However, the mixing precision of the method is very low because it depends on the accuracy of pressure and temperature measurements on the system that is generally not precise due to heating that occurs as the gases are compressed into the cylinder as well as due to other potential sources of system temperature change not accounted for during pressure change. On the other hand, gravimetric-based methods can produce mixes with tighter tolerance limits and is used widely in the gas industry. The gravimetric-based method involves adding a specific mass of each component to the cylinder using a weigh-scale. Because weight measurements are temperature insensitive, this method provides a more accurate means of component addition than pressure-based methods. One limitation of gravimetric systems is the requirement for the added weight of each component of a mixture to be high enough relative to the absolute error of the weight measurement. This limitation of gravimetric systems means that as mixture concentrations decrease, the precision required by the weigh-scale used to prepare the mixture, becomes higher for a given mix tolerance target. With the development of more advanced electronic devices, the requirements for mix tolerance are becoming more stringent and even the most accurate weigh-scales cannot satisfy the high accuracy required by some semiconductor manufacturers. The limitations present with both the gravimetric and pressure-based methods can be overcome through the use of dynamic blending methods, where instead of adding each component of the mixture to the cylinder sequentially, all components are simultaneously added into the cylinder. The added amount of each component is controlled via flow rate control device, e.g., mass flow controller, restrictive flow orifice, and the like. The concentration of the mix can be monitored using an in-line analyzer and adjusted during the blending process by increasing or decreasing the flow of one or multiple components based on the concentration feedback from the analyzer. Because the mixture is blended first in the blending manifold and then compressed or distributed into all the cylinders simultaneously, the compositional variation of mix used to fill a given set of cylinders is very low.

Although the setup of a dynamic blending system can be complicated and costly, it is an attractive option due to its inherently higher mixing precision and for semiconductor users that consume large quantities of mixtures in various balance gases, which poses a logistics and handling challenge. Furthermore, frequent cylinder changes add process variation, increase customer costs and increase safety risks associated with cylinder changes. The use of dynamic blending systems allow customers to have the units installed at their site and to make the mixtures as needed at the point of use with no need for cylinders. By way of example, US Patent Publication No. 2012-0227816 discloses a dynamic blending system designed to dilute dopant gases with improved mixing precision and accuracy. Although the blending process represents an improvement over other on-site blending processes, US Patent Publication No. 2012-0227816 is limited to re-blending of off-spec gasses that must be recycled and re-blended into product specification/tolerance.

Other operational challenges remain with conventional dynamic blending processes which are currently commercially available. For example, unlike blenders used for cylinder filling that allow for relatively easier control of the concentration due to allowances for venting during startup and shutdown, dynamic blenders used on a customer site to make mixtures as needed, are required to achieve higher mix precision while frequently stopping and starting on an irregular or intermittent basis as customer needs fluctuate. As previously mentioned, acceptable compositional tolerance limits within the semiconductor industry continue to narrow. As a result, even slight deviations from the target concentration may lead to off-spec gas product which requires time-consuming corrective actions and/or generation of waste product that must be vented or discarded by other suitable means in a safe manner.

There is an unmet need for an improved dynamic blending system and process that can successfully produce blended mixtures with higher precision at reduced tolerance limits while reducing the generation of waste.

SUMMARY OF THE INVENTION

The present invention relates in part to a system and process for dynamically blending gases as needed with a narrow tolerance in a closed control loop in a manner that reduces waste, can eliminate venting and improve mixing precision and accuracy.

In accordance with one aspect of the present invention, a method for reducing mixing variation during a dynamic blending process is provided. The process involves regulating a flow rate of active gas using a first control device; and regulating a flow rate of balance gas using a second flow control device. Blending the active gas with the balance gas occurs to produce a blended gas mixture. Next, the blended gas mixture is measured to obtain a concentration of the blended gas mixture with an in-line analyzer situated downstream of the mixer when each of the (i) pressure across the analyzer, (ii) the flow rate of the active gas; and (iii) the flow rate of the balance gas has stabilized to their corresponding target values to generate a measured concentration of the blended gas mixture. Variation is minimized between the measured concentration of the blended gas mixture and the target concentration of the blended mixture by dynamically fine-tuning the flow rate of the active gas and/or the flow rate of the balance gas in response to the measured concentration. The fine-tuning occurs in the absence of any recycling of the blended gas mixture.

In accordance with another aspect of the invention, a method for reducing variation during dynamic blending occurring on an intermittent basis to produce a target concentration of a gas mixture is provided. An active gas is ramped up to a first predetermined flow rate at a first preset rate based on a previous blending run. A balance gas is ramped up to a second predetermined flow rate at a second preset rate based on the previous blending run so as to maintain a substantially constant flow ratio of the active gas to the balance gas. An in-line analyzer is activated when the pressure across the analyzer, the flow rate of the active gas and the flow rate of the balance gas each has stabilized to their corresponding target values. The active gas is blended with the balance gas to produce a blended gas mixture. A concentration of the blended gas mixture is measured with the in-line analyzer that is situated downstream of the mixer to generate a measured concentration of the blended gas mixture. The variation between the measured concentration of the blended gas mixture and the target concentration is minimized by dynamically fine-tuning the flow rate of the active gas and/or the flow rate of the balance gas in response to the measured concentration of the blended gas mixture. The in-line analyzer is deactivated followed by ramping down the flow rate of the active gas and ramping down the flow rate of the balance gas at the substantially constant flow ratio until the flow rate of the active gas and the balance gas each reaches substantially zero.

In accordance with another aspect of the present invention, a method for analyzing a gas mixture in a surge vessel without generating waste gas is provided. A pressure of the gas from the surge vessel is regulated using a pressure control device. A flow rate of the gas mixture is regulated from the surge vessel using a flow control device. A predetermined quantity of the gas mixture is sent to a secondary analyzer for measurement of the concentration of the gas mixture. The predetermined quantity of the gas mixture from the secondary analyzer is discharged into a sample collection vessel at a fill pressure that is lower than a fill pressure of the surge vessel. The gas mixture is supplied from the sample collection vessel to a downstream user at a supply pressure that is greater than or at least equal to a supply pressure of the gas mixture in the surge vessel. The supplying of the gas mixture to the downstream user occurs in the absence of pressurizing the mixture.

In accordance with yet another aspect of the present invention, a system for reducing mixing variation in a dynamic blending process is provided. The system comprises an active gas source having a first control valve connected to a first flow controller configured for regulating a predetermined flow rate of the active gas. A balance gas source is also provided having a second control valve connected to a second flow controller configured for regulating a predetermined flow rate of the balance gas. A mixer is configured to receive the predetermined flow of the balance gas and the predetermined flow of the active gas and thereafter discharge a blended gas mixture from the mixer. An in-line analyzer is provided that is situated downstream of the mixer and configured to measure the concentration of the blended gas mixture when the pressure across the analyzer, the flow rate of the active gas and the flow rate of the balance gas each has stabilized to their corresponding predetermined values. The in-line analyzer thereafter is configured to generate measurement signals referable to concentration levels of the blended gas mixture. A first back pressure control device located downstream of the in-line analyzer is provided for maintaining a substantially constant pressure across the in-line analyzer. A controller is also provided that is in communication with the in-line analyzer and the first control valve and the second control valve. The controller is responsive to the measurement signals and configured to minimize variation between the measured concentration of the blended gas mixture and a target concentration of the mixture by dynamically fine-tuning the flow rate of the active gas and/or the flow rate of the balance gas in response to the measured concentration of the blended gas mixture. The system also includes one or more surge vessels located downstream of the in-line analyzer to accumulate the blended gas mixture and thereafter direct said mixture as a product stream to an end-user or as an alternative direct said mixture to a secondary analyzer.

BRIEF DESCRIPTION OF THE DRAWINGS

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

Figure 1:
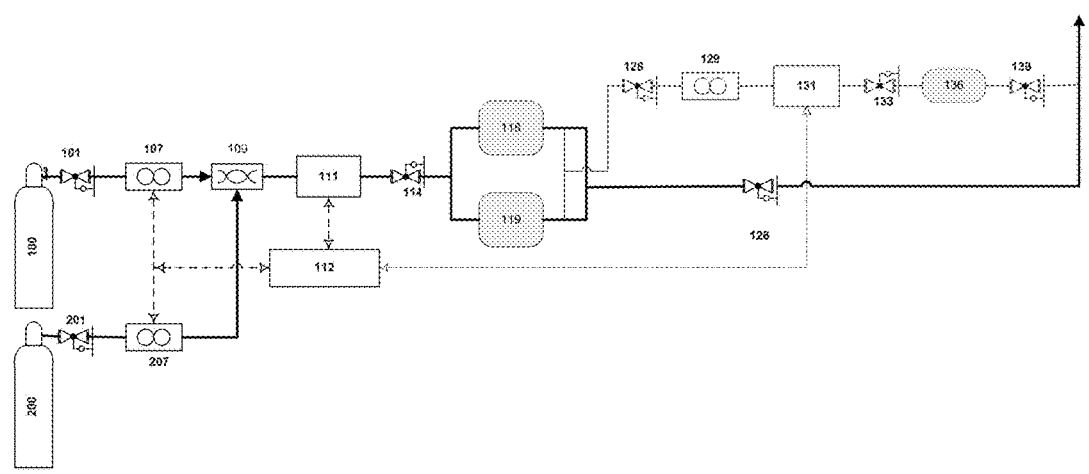
FIG. 1 shows a process flow diagram incorporating the principles of the inventive blending protocol.

As used herein, all concentrations are expressed as volumetric percentages. One aspect that embodies the principles of the present invention will now be described. FIG. 1 shows a process flow diagram of an on-site dynamic blending system in accordance with the principles of the present invention. As will be explained, the system and process of FIG. 1 is designed to dynamically blend gas mixtures with the capability to achieve higher mix precision at reduced tolerance limits with increased gas utilization.

The supply gas sources for the active gas and the balance gas are designated as active gas source 100 and balance gas source 200, respectively. Each of the two gas sources 100 and 200 may be contained in a variety of different vessels such as, by way of example, ISO containers, drums, ton containers, tubes, or cylinders.

$H_2$ or other inert gases may be used as the balance gas contained in balance gas source 200. A variety of active gas sources as known in the art may be utilized, such as, for example, phosphine ($PH_3$), arsine ($AsH_3$), trimethylboron ($B(CH_3)_3$), silane ($SiH_4$), diborane ($B_2H_6$), disilane ($Si_2H_6$), germane ($GeH_4$), boron trifluoride ($BF_3$), boron trichloride ($BCl_3$), fluorine ($F_2$), xenon (Xe), argon (Ar) and krypton (Kr), or mixtures of these active gases with other gases including the balance gas.

The delivery pressures of the active gas source 100 and the balance gas source 200 may be controlled by corresponding pressure regulators 101 and 201, respectively. Downstream of the pressure regulators 101 and 201 are gas flow controlling devices 107 and 207 which control the flow rates of the active and balance gases, respectively, through the process piping. Various gas flow control devices as known in the art may be used, such as, for example, mass flow meters, orifices, and adjustable valves. Preferably, and as shown in FIG. 1, the gas flow metering devices are mass flow controllers ("MFC's").

The blending system includes a mixer 109, into which active gas and balance gas are dynamically blended. The term "mixer" as used herein refers to any type of mixing device known in the art for use in blending gaseous components. Possible mixing devices include, but are not limited to, mixing manifolds, mixing chambers with impellers, and conduits with baffles. As active gas and balance gas flow at their predetermined flow rates through the mixer, the gases are blended. It should be understood that the terms "mixer" and "dynamic blender" and "blender" will be used interchangeably with each other throughout the specification.

The blended gas stream exits the mixer 109 and is then sampled by gas analyzer 111. A back pressure control device 114 is used to keep the pressure of the gas through the analyzer 111 substantially constant which ensures accurate measurement. The gas mixture entering the gas analyzer 111 is preferably of uniform composition. Gas analyzer 111 measures the concentration of the blended gas stream and then sends a signal to the controller 112 which then sends a signal to mass flow controller 107 and/or 207 to make appropriate adjustments to the flow rates of active gas and/or balance from their respective gas sources 100 and 200 in order to increase mixing precision and reduce variation of the mixture concentration within the tolerance limits. The present invention utilizes fine-tuning to improve the mix precision. "Fine-tuning" as used herein refers to the adjustment of flow rates of the active gas and/or the balance gas to produce an in-spec blended gas mixture that is based on concentrations measured by the in-line blending analyzer 111. "In-spec" as used herein refers to the concentration of the blended mixture that meets applicable product specification and is within a predetermined tolerance. "Off-spec" as used herein refers to the concentration of a blended mixture produced by a specific blending run or operation that does not meet applicable product specification and is outside of a predetermined tolerance. "In-line analyzer" as used herein refers to the entire blended gas mixture produced by mixer 109 being analyzed by the analyzer 111. The flow rates of the active gas and the balance gas are regulated to be in a range in which the blending of the active gas with the balance gas produces a blended gas mixture having a concentration of active gas that meets a pre-determined specification during operation, and through fine tuning can incrementally minimize the in-spec variation of the blended mixture such that there is reduced variation within the tolerance limits. In this regard, the blending protocol is designed to not substantially alter the blending flow rates but yet have the ability to increase mixing precision by reducing error during the process that is caused, at least in part, by variation of gas flow rates and concentration measurement error.

As part of the fine-tuning utilized by present invention, a feedback control loop procedure can be repeated throughout the gas blending process to monitor the gas mixture produced from blending in the mixer 109 and in response thereto, incremental adjustments to the mass flow controllers 107 and/or 207 are performed, if required, to ensure that the gas concentration of the active source is within the acceptable tolerance of the target concentration and that the blended mixture exhibits reduced variation within the tolerance limits such that high precision mixtures are consistently produced. As a result, the present invention does not produce off-spec gas and therefore does not include a recycle loop. Furthermore, no waste product is generated that must be vented or discarded by other suitable means. Accordingly, the mass flow controllers 107 and/or 207 are dynamically adjusted with a closed-loop feedback controller 112 that is capable of controlling blend accuracy and precision of the active gas and balance gas in real-time. The system of the present invention as part of the control loop methodology includes a controller in communication with the in-line analyzers 111 and 131 and control valves for the active gas source 100 and balance gas source 200. The controller is responsive to the measurement signals and configured to minimize variation between the measured concentration of the blended gas mixture and a target concentration of the mixture by dynamically fine-tuning the flow rate of the active gas and/or the flow rate of the balance gas in response to the measured concentration of the blended gas mixture. The present invention recognizes a potential exists for the dynamic blender to start and stop frequently, especially when the blending occurs on a user's site. The frequent starting and stopping of the blender can occur at irregular intervals (i.e., "intermittent basis") and therefore has the potential to produce large variations in mixture concentration due to the variations in flow rate invariably occurring during start and stop. Additionally, during this period, the measurement errors from the in-line analyzer 111 can be large due to unstable flow rates and system pressures which would generate even higher variations in mixture concentration if the concentration result from the in-line analyzer is used to control mixing. In order to reduce the variation of mixture concentration and to improve mixing precision, when the dynamic blender 109 starts, the blending protocol in accordance with the present invention ramps up flow rates of both the active gas and balance gas at a preset ramping rate to pre-determined flow rates that are based on earlier mixing runs at the same relative ramping rate; once the flow rates reach the pre-determined value and gas pressure becomes stabilized, the in-line analyzer 111 then becomes active and is used to control the mixture concentration throughout the remainder of the blending process prior to stopping of the flow. Analyzer control occurs by slightly or incrementally adjusting one or more mass flow controllers based on the mix concentration measured by the in-line analyzer 111. Preferably, in one embodiment of the present invention, only the flow rate of the active gas is adjusted while the flow rate of the balance gas is kept constant. As previously mentioned, and unlike conventional blending processes, the blending protocol of the present invention does not significantly vary the blending flow rates of active gas or balance gas over a wide range. After one or more of the flow rates are incrementally adjusted, a specified amount of time is required for the mix to reach the in-line analyzer 111 and be measured, e.g., preferably a few seconds depending, at least in part, upon flow rates and piping length. Therefore, the blending protocol is designed to not conduct another flow rate adjustment until the mix reaches in-line analyzer 111. This can be done by setting a predetermined minimum delay time between each MFC adjustment to ensure the concentration of the current fine-tuned blended gas mix is measured and thereafter used as a basis for the next flow rate adjustment to further refine the concentration of the gas mixture produced in the next blend that is produced. In this manner, the present invention eliminates the potential for the blending protocol to pre-maturely adjust the one or more flow rates (and, therefore potentially over compensate or over-adjust) by virtue of the in-line analyzer 111 taking a measurement prior to the adjusted blended gas mix reaching the in-line analyzer 111. When it is time to stop the blending process, the control system stops analyzer control first and then ramps down each of the flow rates of both the active gas and balance gas to 0 at the same preset ramping rate so that the flow ratio of active to balance gas source is maintained while the flow rates decrease. The mixture is then directed to surge vessels 118 and/or 119. The surge vessels 118 and/or 119 acts as a storage reservoir which absorbs process variations, such as, for example, mixture concentration, pressure, and flow rate. The use of surge vessel 118 and/or 119 allows the blending in mixer 109 to occur at a substantially constant blending flow rate which further enhances the mixing precision of the present invention. Furthermore, surge vessel 118 and/or 119 can be used to avoid gas feed supply pressure variation to an optional compressor if used. The dynamic gas blending process and system may include one or multiple surge vessels, depending at least in part on the usage and downstream process requirements. Preferably, two surge vessels 118 and 119 may be utilized as shown in FIG. 1. The surge vessels 118 and 119 may be configured to continuously supply product gas mixtures to an end-user located downstream of the vessels 118 and 119. When gas pressure in one of the vessels 118 and 199 becomes unacceptably low in view of established process procedure and guidelines, the system and process of the present invention is designed to be preferably configured to switch from the surge vessel with low pressure to another vessel automatically and to continue to supply the product gas mixture downstream without supply interruption. The surge vessel 118 or 119 with low pressure can then be filled. The surge vessels 118 and 119 are arranged so that one of the surge vessels 118 or 119 is always filled and on-line while the other vessel 118 or 119 can be under fill, analysis or be ready to supply the gas mix as a product stream to an end-user located downstream.

After a surge vessel 118 or 119 has been filled, the gas may be supplied to the downstream user directly from the surge vessel 118 or 119 through a regulator 126 as mentioned above. An optional secondary analyzer 131 may be equipped to further analyze the gas mixture concentration within the filled surge vessel 118 or 119. The setup of an optional secondary analyzer 131 further assures and provides an integrity check to the upstream blending process that the active gas concentration of the product mixture to be delivered downstream is within acceptable tolerance limits before the product gas is used in the downstream process. In addition, the analytical result obtained from the product gas in the surge vessel 118 or 119 can be used to determine the mixing concentration target for the next fill. In other words, the measured concentration in the surge vessel 118 or 119 is preferably measured by the secondary analyzer 131. The measured concentration is thereafter preferably utilized to determine the appropriate target mixing concentration for performing the next mixing or blending operation. Additionally, the concentration as measured in each of the in-line analyzer 111 and the secondary analyzer 131 is calibrated to take into account the effects of temperature, pressure and/or flow rate or any combination thereof. The present invention therefore has the ability to fine-tune successive mixes to produce high precision blends.

In this manner, the mix concentration as measured in the surge vessel 118 and/or 119 allows for fine tuning in each of the successive mixes and fills, thereby allowing the present invention to have the ability to further tighten the concentration of the in-spec blended mixes to be within the tolerance of the mixtures accumulating in surge vessels 118 and/or 119. As a result, unlike conventional dynamic blending processes, high precision mixes are consistently produced by the present invention with significantly reduced variation within the tolerance limits.

Since the product gas mixture can be supplied from the blending system directly to the user or from one or multiple surge vessels 118 and 119 in which the concentration of the product gas in each surge vessel 118 and 119 is verified independently, the system and process of the present invention allows for the incremental addition of surge vessels without supply interruption. The embodiment shown in FIG. 1 is equipped with two surge vessels 118 and 119. However, other variations are contemplated by the present invention. Alternatively, the product gas mixture may be supplied directly to the process from the blending system without the use of surge vessels. Still further, the mixture may be blended as needed and the surge vessels used only as a pass-through for the blended mixture from the blending system to the downstream user. In another embodiment, the surge vessels may be used as a backup source in the event that the blending system is off-line for maintenance, gas re-supply, and/or other reasons that are apparent one of ordinary skill in the art. It should be understood that besides on-site blending, the blending system of the present invention may also be configured and used to fill cylinders or containers, which can then be transported to the user's location and used.

FIG. 1 shows that the pressure and flow rate of sample gas from the filled surge vessel 118 or 119 are controlled using regulator 128 and flow control device 129, respectively. A back pressure regulator 133 is used to keep the pressure of sample gas through in-line analyzer 131 substantially constant. The sample gas from in-line analyzer 131 is then stored temporarily in a sample collection vessel 136. When the analysis is done and the mixture is determined to be in product specification, the gas mixture in sample collection vessel 136 is directed as a product mixture to be supplied downstream through a regulator 139 for use by the downstream user. The use of a bypass sample loop as shown in FIG. 1 can allow better control and stability of the flow rate and pressure of sample gas through the in-line analyzer 131. In accordance with the principles of the present invention, the flow rate and pressure of the sample gas through the in-line analyzer 131 are kept substantially constant, which ensures reduced error and therefore more accurate measurement. Alternatively, fewer analyzers may be equipped, e.g., in-line analyzer 109 alone may be used to analyze all the gas mixture streams by equipping sample lines from surge vessels 118 and 119 to analyzer 109.

Preferably, and in accordance with one embodiment of the present invention, the pressure set on regulator 139 is greater than or at least equal to the pressure set on regulator 126 so that the gas in sample collection vessel 136 can be utilized by downstream user. After the gas pressure in sample collection vessel 136 drops to a desired level, e.g., slightly higher than or equal to the set value on regulator 139, sample collection vessel 136 is then isolated from the supply downstream and is ready to collect sample gas for the next analysis. The sample collection vessel 136 is designed so that the pressure in the collection vessel is sufficiently low enough that sample gas can be collected therewithin from the surge vessel 118 and/or 119 after the surge vessel 118 and/or 119 is filled and the pressure in the vessel 136 is high enough after the analysis by secondary analyzer 131 so that the gas mixture in the collection vessel 136 can be directed and utilized by a downstream user with no need for venting and without the need for pressurization by an external device such as a pump. By utilizing the pressure difference between surge vessel 118/119, downstream supply and sample collection vessel 136, the process allows the product gas in the surge vessel 118/119 to be analyzed; the sample gas to be routed to the supply loop; and increased gas utilization to be achieved without generating any waste gas. In a preferred embodiment, 100% gas utilization is obtained such that no waste gas is generated; none of the gas mixture is required to be vented; and increased pressurization of the mixture is not required as the sampled gas is discharged downstream to an end-user. Table 1 below shows an example of pressure settings that may be used to sample the mixture in the surge vessels 118/119 so that no venting of the blended gas mixture is required.

The sample collection vessel 136 may be sized based on the requirement of sampling time and flow rate. For example, assuming a sampling flow rate is 0.5 standard liter per minute (SLM), for a 20 minute sampling time, the total sample volume is 10 SL. If the max fill pressure and drain down pressure of sample collection vessel are 75 psig and 65 psig, respectively, then the volume of the sample collection vessel needs to be ≥15 Liter. The pressures set forth in Table 1 are intended to merely illustrate the protocol and wide applicability of the blending protocol to various process scenarios. Modifications are contemplated by the present invention.

TABLE 1

| Items | Pressure (Psig) |
|---|---|
| Fill pressure in Surge Vessel 118 and 119 | 90 |
| Supply pressure from Surge Vessel to downstream user-regulator 126 | 65 |
| Sampling pressure from Surge Vessel to analyzer131-regulator 128 | 85 |
| Set point of back pressure regulator 133 | 80 |
| Max Fill pressure in sample collection vessel 136 | 75-80 |
| Supply pressure from sample collection vessel 136 to downstream user - set point of pressure regulator 139 | 65-70 |

Alternatively, it should be understood that the present invention contemplates the sampling gas from the secondary analyzer 131 may flow freely from sample collection vessel 136 to a downstream user without using regulator 139. Furthermore, if the downstream piping can hold and/or use the amount of sample gas in real-time (for example, the sample gas does not increase the pressure of the downstream piping to an unacceptable level that the downstream piping cannot handle any additional sample gas), then both the sample collection vessel 136 and its corresponding regulator 139 may not be needed to practice the dynamic blending of the present invention. As a result, the sampling gas may flow freely from secondary analyzer 131 through back pressure regulator 133 and then directly to the downstream piping.

Figure 2:
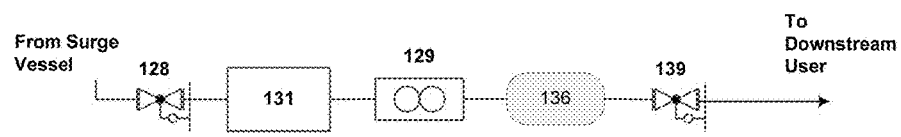
FIG. 2 shows an alternative sampling flow diagram incorporating the principles of the inventive blending protocol.

Other means for maintaining a substantially constant pressure across secondary analyzer 131 are contemplated by the present invention. For example, an alternative set-up to sampling the product gas mixture from the surge vessel 118/119 is shown in FIG. 2. The supply pressure of the sample gas mixture from the filled surge vessel 118/119 is regulated using regulator 128. A flow control device 129 located downstream of secondary analyzer 131 not only controls the flow rate of the sample gas mixture through the analyzer 131, but also prevents the pressure of the sample gas through analyzer 131 from being significantly affected by pressure changes in the sample collection vessel 136, which can further ensure that the pressure of gas across the in-line analyzer remains substantially constant. The setup of FIG. 2 does not require a back pressure regulator as described in FIG. 1. Additionally, it should be understood that the sampling system of FIG. 2 may be equipped with or without a sample collection vessel 136 and a pressure regulator 139.

Other modifications are contemplated. For example, any range of flow rates and concentrations can be incorporated into the blending protocol. Further, the inventive blending protocol as described may consist of controlling with a mass flow controller or other flow control device a single gas stream, two or more gas streams or all gas streams. Additionally, although the examples above illustrate blending a balance gas with a single active gas component, blending of two or more active gas components to respective target concentrations is also contemplated.

The blending protocol for dynamically blending gas to a target concentration having a tight tolerance and increased gas utilization will now be illustrated in more detail by the following examples. However, it is to be understood that the present invention is not limited to the examples. A piezocon sensor (Model No: PZN-SS-003-04) commercially available and produced by Veeco Instruments, Inc. (Plainview, N.Y.) was used as the in-line analyzer to monitor mixture concentration. A high precision back pressure regulator (Model No: EB1LF2) produced by Equilibar, LLC (Fletcher, N.Y.) was used to keep the gas pressure through the analyzer constant.

In all examples, a mixture of 10% $GeH_4$ was used as the active source gas and then further blended with balance gas $H_2$ to produce 1% $GeH_4$ and balance $H_2$. The flow rates of $GeH_4$ active gas mix were regulated using a 0 to 1 standard liter per minute (slpm) $GeH_4$ mass flow controller, and the flow rates of $H_2$ balance gas were regulated with a 0 to 10 slpm $H_2$ mass flow controller. The delivery pressure of 10% $GeH_4$ balance $H_2$ and $H_2$ from source cylinders was controlled at 110 psig and total mixture flow rate was approximately 5 slpm. The blending pressure was controlled at approximately 95 psig by a back pressure regulator. Two 49 Liter cylinders were used as surge vessels. A customized labview control program was developed by the inventors to control the blending process in a closed loop.

Example 1, Blending Precision with Venting

The objective of this Example 1 was to demonstrate the ability to produce high precision mixtures at 1% $GeH_4/H_2$ mixture having a tolerance of ±5 ppm. In this case, the system vented gas. Surge vessels were first vacuumed to <1 torr before being filled. After the blender started and before the mixture concentration stabilized, the mixture was vented to a scrubber. The blender was then switched to fill surge vessel only after the flow rates of source gas, blending pressure and mixture concentration became stabilized. Approximately 5 min to 15 min before the mixture concentration became stabilized after the blender started. During the fill process, the measured result from the analyzer was used to automatically adjust the flow rate of 10% $GeH_4$ balance $H_2$ to further refine and control the mixture concentration. Once the pressure in surge vessel reached 85 psig, the mixture was switched from filling surge vessel to venting before the blending was stopped. Two surge vessels were filled in succession one at a time.

It was observed that even though the pressure of surge vessel increased from less than about 1 torr to 90 psig during the fill process, the pressure across the blending analyzer was maintained within a ±10 torr range by the back pressure regulator.

Figure 3:
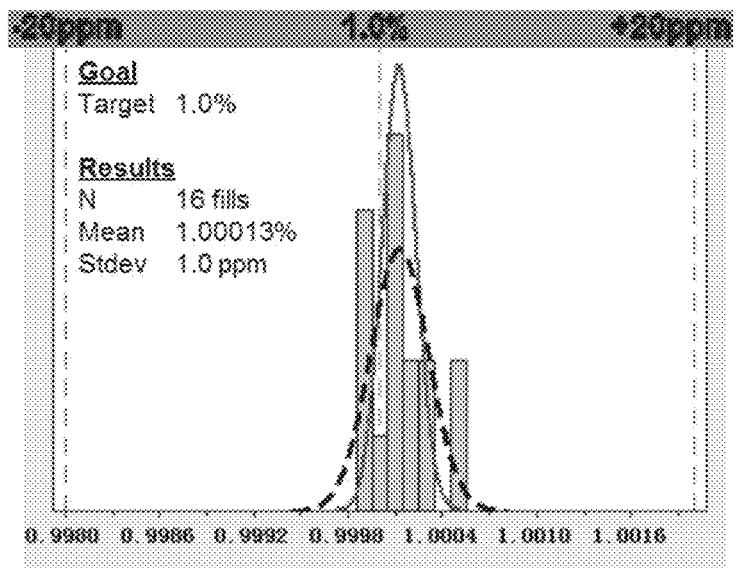
FIG. 3 graphically depicts the tight tolerance of 1% GeH4 mix achieved from Example 1.

After the surge vessel was filled, a sample was withdrawn from surge vessel and the mixture concentration was analyzed by the same analyzer but at a flow rate of 2 Liter/min and a pressure of 20 psig. Surge vessels were filled a total of 16 times. FIG. 3 shows the mixture concentration in surge vessel for the 16 fills. Each of the 16 blends (i.e., fills) was in-spec at 1% $GeH_4/H_2$ mixture. The blends were produced with high mix precision of <±4 ppm tolerance. No recycling of off-spec mixtures was performed.

Example 2, Blending Precision with 100% Gas Utilization

A blender was operated as would be used on a user's site to make gas mixtures as needed. In this case, the system was expected to start and stop very frequently on an intermittent basis and not vent gas. Accordingly, fills were performed utilizing the process of the present invention.

The two surge vessels filled in example 1 were vented to 70 psig and used as surge vessels in this example. The target blending mixture concentration for each fill was pre-determined based on the measured concentration in the two surge vessels as well as the final target of 1% $GeH_4$ balance $H_2$ in the surge vessels. The initial flow rates for both 10% $GeH_4$ balance $H_2$ and balance $H_2$ were pre-determined based on expected flow rates of both source gases needed to achieve a 1% $GeH_4$ balance $H_2$ mix.

When blending started, the flow rates of both source gases were ramped at preset rates to the pre-determined flow rates over 30 seconds. After approximately 1-2 minutes, the gas pressure became stabilized and analyzer control was then activated. The activation of analyzer control indicated that the measured result from analyzer could be used to adjust the flow rate of the 10% $GeH_4$ balance $H_2$ source gas in order to keep the mixture concentration within the specified range. In this example, the process of using the measured result from the analyzer to automatically adjust the flow rate of is the same as that in example 1. When the pressure in the surge vessel reached 90 psig, the analyzer control was deactivated and the flow rates of both source gases were ramped down to 0 over 30 seconds at the same ramping rate to maintain a constant flow ratio of both the active and the balance gas. The surge vessel was then isolated from the blending system and the fill to the vessel was completed. In this example, all the mixture made from the blending system was collected in surge vessel even during the start and stop period without any venting. It took approximately 12 minutes to fill each surge vessel from 70 psig to 90 psig.

Figure 4:
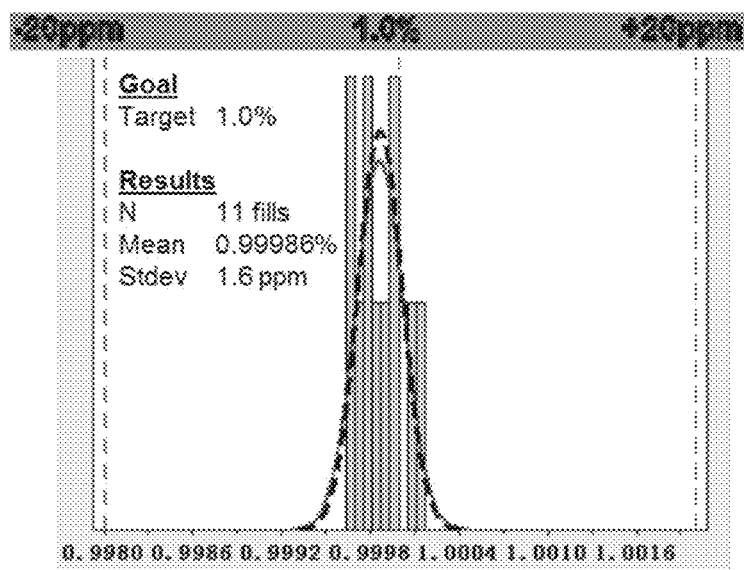
FIG. 4 graphically depicts the tight tolerance of 1% GeH4 mix achieved from Example 2.

The mixture in the vessel was analyzed. A total of 11 fills of the surge vessels were completed following the same process described above. FIG. 4 shows the mixture concentration in the 11 surge vessels. <±5 ppm tolerance was achieved for 1% $GeH_4/H_2$ mixture. No waste gas was generated. No recycling of off-spec mixtures were performed. All fills resulted in blended mixtures that were in-spec. The example demonstrated the ability to produce high precision mixes within a tolerance less than about 5 ppm without generating waste gas and without having to vent any sample gas or vent any portion of a blended gas mixture produced from the blender.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method for reducing mixing variation during a dynamic blending process, comprising the steps of:
   regulating a flow rate of active gas using a first control device;
   regulating a flow rate of balance gas using a second flow control device;
   blending the active gas with the balance gas to produce a blended gas mixture;
   measuring a concentration of the blended gas mixture with an in-line analyzer situated downstream of the mixer only when each of the (i) pressure across the analyzer has stabilized, (ii) the flow rate of the active gas has stabilized; and (iii) the flow rate of the balance gas has stabilized to their corresponding target values to generate a measured concentration of the blended gas mixture;
   minimizing variation between the measured concentration of the blended gas mixture and the target concentration of the blended mixture by dynamically fine-tuning the flow rate of the active gas and/or the flow rate of the balance gas in response to the measured concentration;
   wherein said fine-tuning occurs in the absence of any recycling and venting of the blended gas mixture.

2. The method of claim 1, further comprising ramping up the flow rate of the balance gas prior to the step of regulating the flow rate of the balance gas.

3. The method of claim 1, further comprising directing the blended gas mixture to a downstream user in the absence of venting the blended gas mixture.

4. The method of claim 1, wherein the steps of measuring the concentration and dynamically fine-tuning are done on an intermittent basis.

5. The method of claim 1, further comprising the steps of:
   setting a predetermined minimum delay time for measurement of the concentration by the in-line analyzer, thereby ensuring the most current fine-tuned blended gas mixture reaches the in-line analyzer.

6. A method for reducing variation during dynamic blending occurring on an intermittent basis to produce a target concentration of a gas mixture, comprising the steps of:
   ramping up to a first predetermined flow rate of an active gas at a first preset rate based on a previous blending run;
   ramping up to a second predetermined flow rate of a balance gas at a second preset rate based on the previous blending run so as to maintain a substantially constant flow ratio of the active gas to the balance gas;

activating an in-line analyzer when the pressure across the analyzer, the flow rate of the active gas and the flow rate of the balance gas each has stabilized to their corresponding target values;

blending the active gas with the balance gas to produce a blended gas mixture in the absence of any recycling and venting of the blended gas mixture;

measuring a concentration of the blended gas mixture with the in-line analyzer only after said ramp up to the first predetermined flow rate and the second predetermined flow rate, situated downstream of the mixer to generate a measured concentration of the blended gas mixture;

minimizing variation between the measured concentration of the blended gas mixture and the target concentration by dynamically fine-tuning the flow rate of the active gas and/or the flow rate of the balance gas in response to the measured concentration of the blended gas mixture;

deactivating the in-line analyzer, followed by;

ramping down the flow rate of the active gas and ramping down the flow rate of the balance gas at the substantially constant flow ratio until the flow rate of the active gas and the balance gas each reaches substantially zero.

7. The method of claim 6, further comprising accumulating all of the blended gas mixture into a surge vessel in the absence of venting or generating the active gas or the balance gas before, during or after said accumulation.

8. The method of claim 7, measuring the concentration of the blended mixture in the surge vessel at a predetermined flow rate and a predetermined delivery pressure and using said measured concentration as a basis for calculating a new target concentration that is implemented for fine-tuning for a subsequent blending step.

9. The method of claim 6, further comprising the step of directly sending the blended mixture during the ramping up of the flow rate of the active gas and the ramping up of the flow rate of the balance gas to a surge vessel.

10. The method of claim 6, further comprising the step of not measuring the concentration of the mixture during ramping up or ramping down.

11. The method of claim 6, wherein all of the blended gas mixture is measured with the in-line analyzer after activating the in-line analyzer.

12. The method of claim 7, wherein the blended mixture is produced without venting or recycling any portion of the active gas or the balance gas.

13. The method of claim 6, wherein the ramping up and ramping down of the flow rate of the active gas and the balance gas is repeated multiple times without venting or recycling any portion of the active gas or the balance gas.

14. The method of claim 6, wherein no portion of the blended gas mixture is vented as a waste gas.

15. The method of claim 7, further comprising discharging the mixture from the surge vessel at a predetermined delivery pressure to an end-user point without venting or recycling any portion of the mixture.

* * * * *